(12) United States Patent
Kondo et al.

(10) Patent No.: US 8,956,686 B2
(45) Date of Patent: Feb. 17, 2015

(54) RADIATION IMAGE CONVERSION PANEL AND PREPARATION METHOD THEREOF

(75) Inventors: Masashi Kondo, Hachioji (JP); Kuniaki Nakano, Uenohara-machi (JP); Shigetami Kasai, Hino (JP); Hideki Shibuya, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 827 days.

(21) Appl. No.: 11/334,068

(22) Filed: Jan. 18, 2006

(65) Prior Publication Data
US 2006/0141134 A1   Jun. 29, 2006

Related U.S. Application Data

(62) Division of application No. 10/951,577, filed on Sep. 27, 2004, now abandoned.

(30) Foreign Application Priority Data

Oct. 2, 2003   (JP) ................................. 2003-344247
Oct. 2, 2003   (JP) ................................. 2003-344252
Dec. 4, 2003   (JP) ................................. 2003-406246

(51) Int. Cl.
*G21K 4/00*   (2006.01)
*C09K 11/77*  (2006.01)

(52) U.S. Cl.
CPC ............. *G21K 4/00* (2013.01); *C09K 11/7733* (2013.01)
USPC ............................. 427/72; 427/69; 427/255.5

(58) Field of Classification Search
CPC .................................................. G21K 2004/06
USPC .................................. 118/723; 427/72, 255.5
See application file for complete search history.

(56) References Cited

U.S. PATENT DOCUMENTS

| 5,098,813 | A  | * | 3/1992  | Nakano et al. ................. 430/139 |
| 5,371,377 | A  |   | 12/1994 | Struye et al. |
| 5,474,611 | A  | * | 12/1995 | Murayama et al. ..... 118/723 VE |
| 5,952,666 | A  |   | 9/1999  | Nakano et al. |
| 6,605,313 | B1 | * | 8/2003  | Goodman et al. ............... 427/65 |
| 6,660,410 | B2 |   | 12/2003 | Hosokawa |
| 6,815,692 | B2 | * | 11/2004 | Iwabuchi et al. .......... 250/484.4 |
| 6,835,940 | B2 | * | 12/2004 | Morikawa et al. ......... 250/484.4 |

(Continued)

FOREIGN PATENT DOCUMENTS

| EP | 0 859 372 A1 | 8/1998 |
| EP | 0989566 A1   | 11/1998 |
| EP | 1 286 365 A2 | 2/2003 |

(Continued)

OTHER PUBLICATIONS

Translation of Amitani et al, JP 05-249298.*

(Continued)

*Primary Examiner* — Alex A Rolland
(74) *Attorney, Agent, or Firm* — Holtz, Holtz, Goodman & Chick PC

(57) ABSTRACT

Disclosed is a preparation method of a radiation image conversion panel by a vapor deposition method, in which a support member is supported and rotated and the stimulable phosphor evaporated from the evaporation source is deposited onto the support member to form a stimulable phosphor layer. The radiation image conversion panel manufactured by the method is also disclosed.

14 Claims, 5 Drawing Sheets

(56) References Cited

U.S. PATENT DOCUMENTS

2002/0192501 A1* 12/2002 Yano et al. ............... 428/690
2004/0056209 A1   3/2004 Maezawa et al.

FOREIGN PATENT DOCUMENTS

| | | |
|---|---|---|
| EP | 1 286 365 A3 | 2/2003 |
| JP | 05-249298 A | 9/1993 |
| JP | 05249298 A * | 9/1993 |
| JP | 2001-249198 A | 9/2001 |
| JP | 2003-107160 A | 4/2003 |

OTHER PUBLICATIONS

Extended European Patent Office Action dated Aug. 4, 2011.

* cited by examiner

RADIATION IMAGE CONVERSION PANEL AND PREPARATION METHOD THEREOF

This is a Divisional Application of application Ser. No. 10/951,577 filed Sep. 27, 2004, now abandoned.

FIELD OF THE INVENTION

The present invention relates to a radiation image conversion panel having a stimulable phosphor layer containing a stimulable phosphor on a support member according to the vapor deposition method, and a radiation image conversion panel manufacturing method.

According to prior art practice; so-called "radiography" using silver salt has been employed to get a radiographic image. A method of getting a radiographic image without using silver salt has also been developed. To be more specific, a method has been disclosed wherein the radiation having passed through a subject is absorbed by a stimulable phosphor, and this stimulable phosphor is excited by a certain form of energy so that the radiographic energy accumulated in the stimulable phosphor is emitted as a stimulable phosphor. This fluorescent light is detected to get a radiographic image, according to the disclosed method.

To put the method in greater details, a radiation image conversion method is known in the art wherein a panel with a stimulable phosphor layer arranged on a support member is employed, and visible light and/or infrared ray is used as excitation energy (See Patent Documents 1 and 2).

In recent years, a radiation image conversion panel has been proposed for a radiation image conversion method using a stimulable phosphor having a high degree of brightness, sensitivity and sharpness, wherein the aforementioned radiation image conversion panel uses a stimulable phosphor with Eu activated on a matrix of such an alkali halide as CsBr. Especially use of Eu as an activator permits improvement of radiation conversion efficiency that has not been achieved in the prior art.

In the meantime, the analysis of a diagnostic image requires a radiation image conversion panel of high sensitivity. One of the proposed phosphor layers comprises a phosphor wherein the crystalline structure of a stimulable phosphor layer created by vapor deposition method is a cesium chloride structure, and the major direction of growth is specified in the direction (110) or (100) (See Patent Document 3).

Patent Document 1: U.S. Pat. No. 3,859,527
Patent Document 2: Japanese Patent L.O.P. Publication 2001-249198
Patent Document 3: Official Japanese Patent L.O.P. Publication 2003-107160

DESCRIPTION OF INVENTION

However, the description of the radiation image conversion panel in Patent Document 2 refers only to the direction of crystalline growth in the crystalline structure of the stimulable phosphor layer. The first peak intensity representing the maximum intensity appears at different positions from the center of the support member, and the first peak intensity distribution is not isotropic. Thus, the distribution of the heat and residual stress is not uniform. Since uniform distribution cannot be obtained, the panel warps in a certain direction and resistance to shock is reduced. Such problems have been found in the prior art.

Further, the description of the radiation image conversion panel in Patent Document 3 refers only to the direction of crystalline growth in the crystalline structure of the stimulable phosphor layer. The distribution of the first peak intensities representing the maximum intensity in the in-plane direction of the specified crystalline surface is not uniform. Thus, nonuniformity in sensitivity cannot be reduced merely by specifying the direction of crystalline growth, and deterioration of the brightness has also been one of the problems to be solved.

Still further, as shown in the aforementioned Patent Document 2, the AX-based phosphor formed by activating Eu and the like on the base of alkali halide has a high thermal expansion coefficient, and tends to be separated from the support member when crystallinity is increased. Its shock resistance also tends to decrease. The stimulable phosphor layer is required to have excellent resistance to separation and shock, in addition to a high degree of sensitivity and uniformity.

In view of the prior art described above, it is an object of the present invention to provide a radiation image conversion panel having minimum bend and excellent resistance to shock, and a radiation image conversion panel manufacturing method.

The other object of the present invention is to provide a radiation image conversion panel and the manufacturing method thereof, capable of avoiding nonuniformity in sensitivity and deterioration of brightness.

The other object of the present invention is to provide a radiation image conversion panel and its manufacturing method that ensure excellent resistance to peeling and shock, in addition to a high degree of sensitivity and uniformity.

SUMMARY OF THE INVENTION

To solve the aforementioned problems, the invention provides a radiation image conversion panel having a stimulable phosphor layer containing a stimulable phosphor on a support member, wherein a variation coefficient of distribution of first peak intensities representing a maximum intensity of an X-ray diffraction pattern inside the stimulable phosphor layer on a plane of the stimulable phosphor layer is not more than 40%.

An X-ray diffraction pattern is observed in each piece of radiation image conversion panel divided into, for example, 30 pieces or more, to have same dimension, and the maximum intensity of the diffraction pattern in each piece are recorded to obtain distribution of the peak intensities.

The variation coefficient of the first peak intensity of the in-plane X-ray diffraction pattern of the stimulable phosphor layer does not exceed 40%. The distribution of the first peak intensity in the in-plane direction is assumed to be approximately uniform. This arrangement avoids nonuniformity in sensitivity and deterioration of brightness, so that the radiation image quality is improved.

It is preferable that the distribution of the first peak intensity representing the maximum intensity is isotropic from the center of the panel plane, in the X-ray diffraction pattern inside the stimulable phosphor layer.

The distribution of the first peak is isotropic from the center of the panel plane. This provides isotropic crystallinity and isotropic distribution of heat and stress, with the result that uniform distribution is ensured, with the result that panel bend is reduced. This provides excellent resistance to shock, and hence improved quality of a radiation image.

It is preferable that the variation coefficient of the 1st peak intensity is not more than 40%.

Distribution of the first peak intensity within the panel plane is approximately homogeneous and therefore bent of the panel can be minimized, because the variation coefficient of 1st peak intensity within panel direction is not more than 40%.

It is preferable that the variation coefficient of the 1st peak intensity is not more than 30%, and more preferably not more than 20%, and particularly preferably not more than 10%.

An index of a plane of the 1st peak is preferably (x,0,0), wherein x is 1, 2 or 3.

A radiation conversion panel having very high sensitivity is obtained because that index of a plane of the 1st peak is (x,0,0), wherein x is 1, 2 or 3.

The index of a plane of the 1st peak is (x,0,0), wherein x is 2 in one of the preferable embodiments.

It is preferable that the distribution of the packing factor of the stimulable phosphor layer is within ±10%.

In such instance, in-plane distribution of packing factor is assumed as approximately uniform, and the bend of the panel is further reduced. This arrangement provides excellent resistance to separation and shock, in addition to a high degree of sensitivity and uniformity.

The stimulable phosphor is preferably composed of a basic material represented by the following formula (1):

$$M^1X \cdot aM^2X' \cdot bM^3X'' : eA \qquad \text{formula (1)}$$

wherein $M^1$ is at least one alkali metal atom selected from the group consisting of Li, Na, K, Rb and Cs; $M^2$ is at least one divalent metal atom selected from the group consisting of Be, Mg, Ca, Sr, Ba, Zn, Cd, Cu and Ni; $M^3$ is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X' and X" are each a halogen atom selected from the group consisting of F, Cl, Br and I; A is a metal atom selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are each $0 \leq a < 0.5$, $0 \leq b < 0.5$ and $0 < e \leq 1.0$.

This alkali halide phosphor provides a stimulable phosphor having a high degree of sensitivity and sharpness compatible with each other.

A manufacturing method of a radiation image conversion panel using a vapor deposition apparatus comprises:

a vacuum container;

an evaporation source, arranged inside the vacuum container, for causing a support member to evaporate a stimulable phosphor; and a support member rotating mechanism for supporting the support member and rotating it with respect to the evaporation source, thereby evaporating the stimulable phosphor from the evaporation source, wherein the support member is supported and rotated by the support member rotating mechanism in such a way that the stimulable phosphor evaporated from the evaporation source is evaporated onto the support member, whereby a stimulable phosphor is formed.

According to the manufacturing method, the variation coefficient of the first peak intensity in the in-plane X-ray diffraction pattern of the stimulable phosphor layer does not exceed 40%. Thus, the distribution of the first peak intensity in the in-plane direction is assumed to be approximately uniform. This arrangement avoids nonuniformity in sensitivity and deterioration of brightness, so that the radiation image quality is improved.

Further, since vapor deposition of the stimulable phosphor is carried out by rotating the support member, a stimulable phosphor layer is formed uniformly on the support member. Thus, the bend of the panel can be reduced and nonuniformity in sensitivity and deterioration of brightness can be avoided.

Further, the support member is supported and rotated by the support member rotating mechanism in such a way that the stimulable phosphor evaporated from the evaporation source is evaporated onto the support member, whereby a stimulable phosphor is formed. This arrangement provides uniform formation of a stimulable phosphor layer on the support member.

Still further, since the stimulable phosphor is made to evaporate by the rotation of the support member, the residual stress remaining at the time of evaporation is uniformly distributed so that the bend of the panel is reduced. This provides excellent resistance to shock in addition to a high degree of sensitivity and uniformity, and hence improved quality of a radiation image.

According to the radiation image conversion panel and radiation image conversion panel manufacturing method of the present invention, the distributed of the first peak intensity is isotropic from the center of the support member. This arrangement avoids nonuniformity in sensitivity and deterioration of brightness, so that the radiation image quality is improved. This leads to isotropic crystallinity and isotropic distribution of heat and stress, with the result that panel bend is reduced and the resistance to shock is improved.

Further, the stimulable phosphor is evaporated by rotation of the support member. Thus, a stimulable phosphor layer is uniformly formed on the support member, with the result that panel bend is reduced and the resistance to shock is improved.

Further, since the distribution of packing factor is changed isotropically from the center of the support member toward the end, the stress distribution is made uniform and the panel bend is further reduced. This arrangement provides excellent resistance to separation and shock, in addition to a high degree of sensitivity and uniformity.

DETAILED DESCRIPTION OF THE INVENTION

Figure 1:
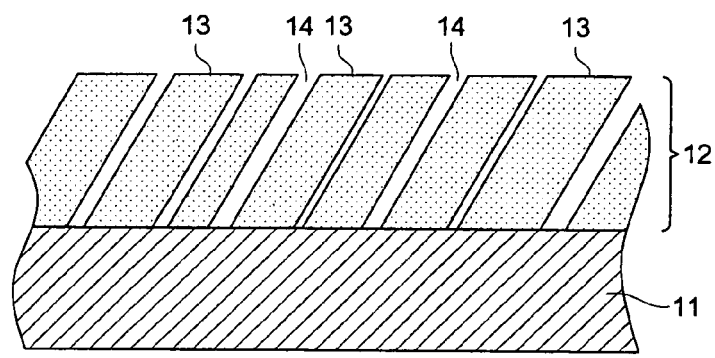
FIG. 1 is a schematic cross sectional view of an example of a stimulable phosphor layer formed on a support member.

The following describes the details of the radiation image conversion panel and its manufacturing method:

The radiation image conversion panel is provided with a support member 11 shown in FIG. 1, and a stimulable phosphor layer 12 formed on the support member 11 and containing the stimulable phosphor. Further, a protective layer is provided to protect the stimulable phosphor layer 12 as required. In the stimulable phosphor layer 12, a clearance 14 is formed with respect to the columnar crystal 13 of the stimulable phosphor.

The inventors of the present invention have found out that nonuniformity in sensitivity and deterioration of brightness can be avoided and the radiation image quality can be drastically improved, by specifying that the variation coefficient of the first peak intensity representing the maximum intensity in the in-plane X-ray diffraction pattern of the stimulable phosphor layer does not exceed 40%.

It is preferred that the variation coefficient does not exceed 30%. More preferably, it should not exceed 20%, and most preferably, it should not exceed 10%.

The variation coefficient is defined as:

Variation coefficient="standard deviation of the in-plane first peak intensity"/"an average of first peak intensities".

In the X-ray diffraction pattern inside the stimulable phosphor layer, isotropic crystallinity and isotropic distribution of heat and stress can be ensured and uniform distribution can be provided, by using a panel where the distribution of the first peak intensity representing the maximum intensity is isotropic from the center of the support member, with the result that panel bend is reduced and the resistance to shock is improved.

Figure 5A:
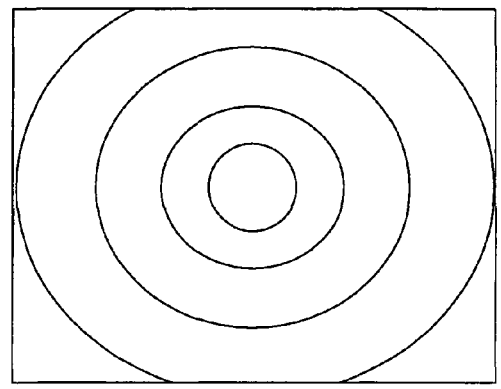
FIG. 5(a) is a drawing showing that the distribution of the first peak intensity is isotropic from the center of the support member.
Figure 5B:
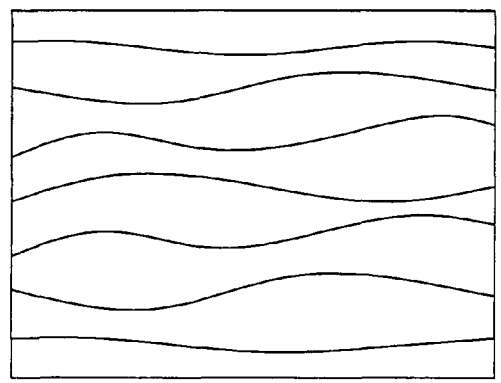
FIGS. 5(b) and (c) are drawings representing that the distribution of the first peak intensity is anisotropic from the center of the support member.
Figure 5C:
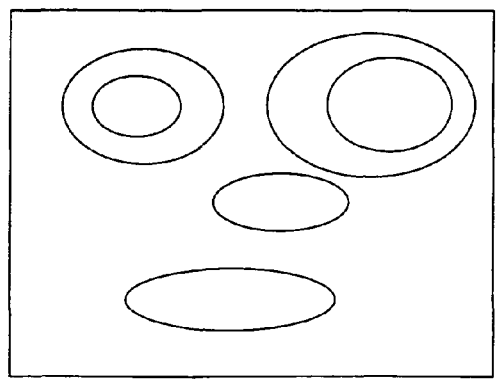

Here the X-ray diffraction pattern has been obtained by using an X-ray diffraction apparatus to measure at an X-ray incident angle of 20 through 70 degrees. That the distribution of the first peak intensity is isotropic from the center of the support member signifies that the intensities of the first peak located approximately on the concentric circle (approximately equi-distant from the center of the support member) are approximately the same, as shown in FIG. 5(a). Anisotropy means that the intensities of the first peak on the illustrated line are the same, as shown in FIG. 5(b) or (c), and the intensities of the first peak located approximately on the concentric circle from the center of the support member are not the same.

It is preferred that the variation coefficient of the first peak intensity does not exceed 40%.

More preferably, the variation coefficient should not exceed 30%. Still more preferably, it should not exceed 20%, and most preferably, it should not exceed 10%.

What is called a variation coefficient can be defined as:

Variation coefficient="standard deviation of the in-plane first peak intensity"/"an average of first peak intensities".

It is also preferred that the index of a plane in the peak be (x, 0, 0) plane [x=1, 2, 3]. It is particularly preferred that x=2.

The sensitivity, uniformity and resistance to separation and shock can be improved by keeping the distribution of packing factor of the stimulable phosphor layer within ±10%.

The following describes how to measure the packing factor and the distribution thereof:

(How to Measure the Packing Factor)

Cut the stimulable phosphor layer in the size of "A cm by A cm", and measure the film thickness B (cm) using a micrometer, and the weight C (grams) using a balance. When the specific weight ρ of CsBr is assumed as 4.43;

Packing factor $D=C/(A^2 \times B \times \rho)$ (How to Measure the Packing Factor Distribution)

Cut out 30 stimulable phosphor layer pieces from one radiation image conversion panel, and calculate the packing factor D for each of these layers. When the maximum packing factor is Dmax, and the minimum packing factor Dmin:

Packing factor distribution (%)=((Dmax−Dmin)/(Dmax+Dmin))×100

Here the packing factor distribution is assumed to be within ±10%. This is because, if it has exceeded ±10%, the packing factor will be irregular and the panel will tend to warp. As a result, the inconsistent sensitivity or separation will occur, and shock resistance will be reduced.

Incidentally, the packing factor of the stimulable phosphor layer can be adjusted, for example, by changing the degree of vacuum to $10^{-4}$ Pa through 1.0 Pa at the time of vapor deposition or the distance between the support member and evaporation source.

It is preferred that the distribution of packing factor of the stimulable phosphor be changed isotropically from the center of the support member toward the end. The isotropic distribution of packing factor allows the stress distribution resulting from the distribution of the packing factor to exhibit isotropic and uniform distribution, thereby ensuring the minimized panel bending and excellent resistance to separation and shock, in addition to a high degree of sensitivity and uniformity.

Figure 6:
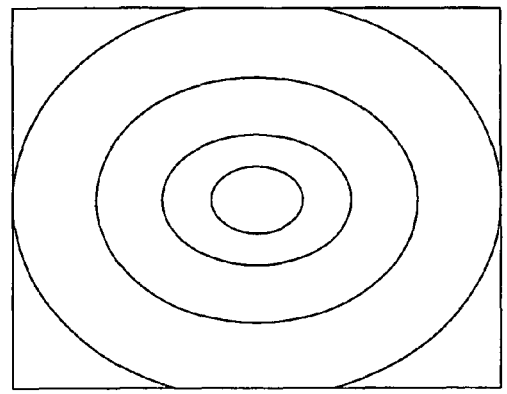
FIG. 6(a) is a drawing showing that the distribution of the packing factor is isotropic from the center of the support member.
FIGS. 6(b) and (c) are drawings representing that the distribution of the packing factor is anisotropic from the center of the support member.
Figure 6:
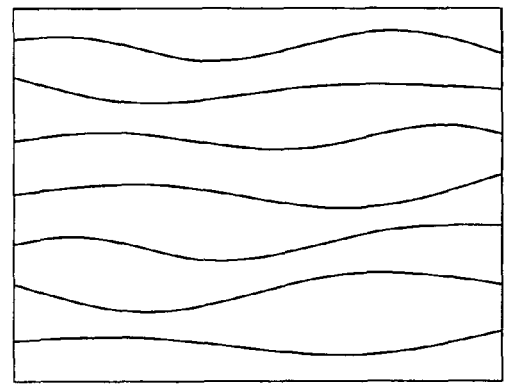
Figure 6:
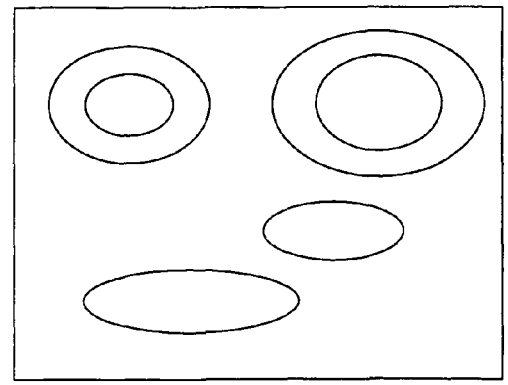

The isotropic change of the packing factor from the center of the support member toward the end means that the distribution of the packing factor located in a concentric circle (approximately equi-distant from the center of the support member) is approximately the same, as shown in FIG. 6(a). Anisotropy means that the distribution of the packing factor on the illustrated line is the same, as shown in FIG. 6(b) or (c), and the distribution of packing factor located approximately on the concentric circle from the center of the support member is not the same.

A desired support member used in the present invention as the support member for the prior art radiation image conversion panel can be selected from among the known materials. When the support member is used for forming a phosphor layer according to the vapor deposition method, it is preferred to use a metallic sheet comprising a quartz glass sheet, aluminum, iron, tin and chromium, or a carbon fiber reinforced sheet.

Further, the support member is preferred to have a resinous layer to get a smooth surface.

The resinous layer should preferably contain a compound such as polyimide, polyethylene terephthalate, paraffin and graphite, and the preferred thickness thereof is about 5 through 50 microns. This resinous layer can be arranged on the surface or back of the support member.

In this case, a lamination method or coating method may be used as a means for providing a resinous layer on the support member.

When the lamination method is used, it is preferred that a pressure roller is used to carry out lamination at a heating temperature of about 80 through 150° C., at a pressure of $4.90 \times 10$ through $2.94 \times 10^2$ N/cm, and at a conveyance speed of 0.1 through 2.0 meters per second.

To get the effect of the present invention, the film thickness of the stimulable phosphor layer of the present invention should be 50 through 2000 microns and preferably be 50 through 1000 microns or more preferably be 100 through 800 microns, although this figure may differ according to the purpose of using the radiation image conversion panel or the type of the stimulable phosphor.

The stimulable phosphor used in this invention preferably comprises one represented by the following formula (1):

$M^1X.aM^2X'.bM^3X'':eA$                                formula (1)

wherein $M^1$ is at least one alkali metal atom selected from the group consisting of Li, Na, K, Rb and Cs; $M^2$ is at least one divalent metal atom selected from the group consisting of Be, Mg, Ca, Sr, Ba, Zn, Cd, Cu and Ni; $M^3$ is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X' and X" are each a halogen atom selected from the group consisting of F, Cl, Br and I; A is a metal atom selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are each $0 \leq a < 0.5$, $0 \leq b < 0.5$ and $0 < e \leq 1.0$.

In the formula (1), $M^1$ is at least one alkali metal atom selected from the group consisting of Li, Na, K, Rb and Cs, preferably at least one alkali metal atom selected from Rb and Cs atoms, and more preferably Cs atom.

$M^2$ represents a divalent metal selected from the group consisting of Be, Mg, Ca, Sr, Ba, Zn, Cd, Cu and Ni. Of these, a divalent metal selected from the group consisting of Be, Mg, Ca, Sr, and Ba is preferred.

$M^3$ represents a trivalent metal selected from the group consisting of Sc, Y, La, Ce, Pr, Nd, Pm, Sm, Eu, Gd, Tb, Dy, Ho, Er, Tm, Yb, Lu, Al, Ga. Of these, a trivalent metal selected from the group consisting of Y, Ce, Sm, Eu, Al, Gd, Lu, Ga and In is preferred.

A represents a metal selected from the group consisting of Eu, Tb, In, Ce, Tm, Dy, Pr, Ho, Nd, Yb, Er, Gd, Lu, Sm, Y, Tl, Na, Ag, Cu and Mg.

X, X' and X" are each at least one halogen atom selected from the group consisting of F, Cl, Br and I, preferably at least one halogen atom selected from F, Cl and Br, and more preferably Br in terms of enhancing stimulated emission of a stimulable phosphor.

In the formula (1), "a" is $0 \leq a < 0.5$ and preferably $0 \leq a < 0.01$; "b" is $0 \leq b < 0.5$, and preferably $0 \leq b \leq 0.01$; "e" is $0 < e \leq 1.0$, and preferably $0 < e \leq 0.1$.

It is preferable that a stimulable phosphor having combination of atoms of Cs for $M^1$ and Br for X in the Formula (1) is employed as a base material in this invention.

The stimulable phosphor represented by the formula (1) can be prepared, for example, in the following manner.

As phosphor raw material, at least one compound selected from each of the following groups (a) and (b), and a compound containing a metal atom selected from the following group (c) are used:

(a) at least one compound selected from each of the following groups are used:
NaF, NaCl, NaBr, NaI, KF, KCl, KBr, KI, RbF, RbCl, RbBr, RbI, CsF, CsCl, CsBr, and CsI;

(b) at least one compound selected from each of the following groups are used:
$MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$;

(c) a compound containing a metal atom selected from the following group is used:
Eu, Tb, In, Cs, Ce, Tm, Dy, Pr, Ho, Nd, Yb, Er, Gd, Lu, Sm, Y, Tl, Na, Ag, Cu and Mg.

Phosphor raw materials, which have been selected from the foregoing (a) to (c) so as to have mixing composition meeting the numerical range, as defined in this invention are weighed and dissolved in pure water. In this regard, there may be conducted sufficient mixing using a mortar, ball mill or mixer mill. Next, a prescribed amount of an acid is added to adjust a pH value (C) of the thus obtained solution so as to fall within the range of $0 < C < 7$, and then any water is vaporized.

Further, the obtained raw material mixture is charged into a heat-resistant vessel such as a silica port, an alumina crucible or a silica crucible and then placed in an electric furnace to be calcined. The calcination temperature preferably is 500 to 1000° C. The calcination time, depending on a charging amount of raw materials, calcination temperature and the like, preferably is 0.5 to 6 hrs.

As a calcinations atmosphere is employed a weakly reducible atmosphere such as a nitrogen gas atmosphere containing a small amount of hydrogen gas or a carbon dioxide atmosphere containing carbon monoxide, a nitrogen gas atmosphere, a neutral atmosphere such as an argon gas atmosphere, or a small amount of oxygen-introduced weakly oxidizing atmosphere.

After completion of calcination under the foregoing condition, calcined material is taken out of the electric furnace and subjected to pulverization. Thereafter, powdery calcined material may again be charged into a heat resistant vessel and then placed in an electric furnace to be calcined under the foregoing condition to further enhance emission luminance of the phosphor. When the calcined material is allowed to cool from calcination temperature to room temperature, the intended phosphor can be obtained by being taken out the calcined material from an electric furnace and allowing it to stand in an aerial atmosphere. In this regard, the calcined material may be cooled in the same atmosphere as in the calcination, such as a weakly reducing atmosphere or neutral atmosphere.

Alternatively, it is preferred that the calcined material is moved from a heating section to a cooling section within the electric furnace, followed by being rapidly cooled in a weakly reducing atmosphere, neutral atmosphere or weakly oxidizing atmosphere, thereby leading to further enhanced stimulated emission luminance of the phosphor.

The stimulable phosphor layer relating to this invention is a layer of vapor deposited stimulable phosphor and is formed by vapor deposition (or vapor-phase deposition process).

A vacuum evaporation method, a sputter deposition method, a CVD method, ion plating method and other methods may be employed to deposit the stimulable phosphor on the support to form a stimulable phosphor layer, however the vacuum evaporation method is particularly preferable.

The following describes a preferred vapor deposition method: In this case, a vapor deposition apparatus shown in FIG. 3 is used to evaporate stimulable phosphor onto the support member, and vapor deposition method together with the vapor deposition apparatus will be explained.

Figure 3:
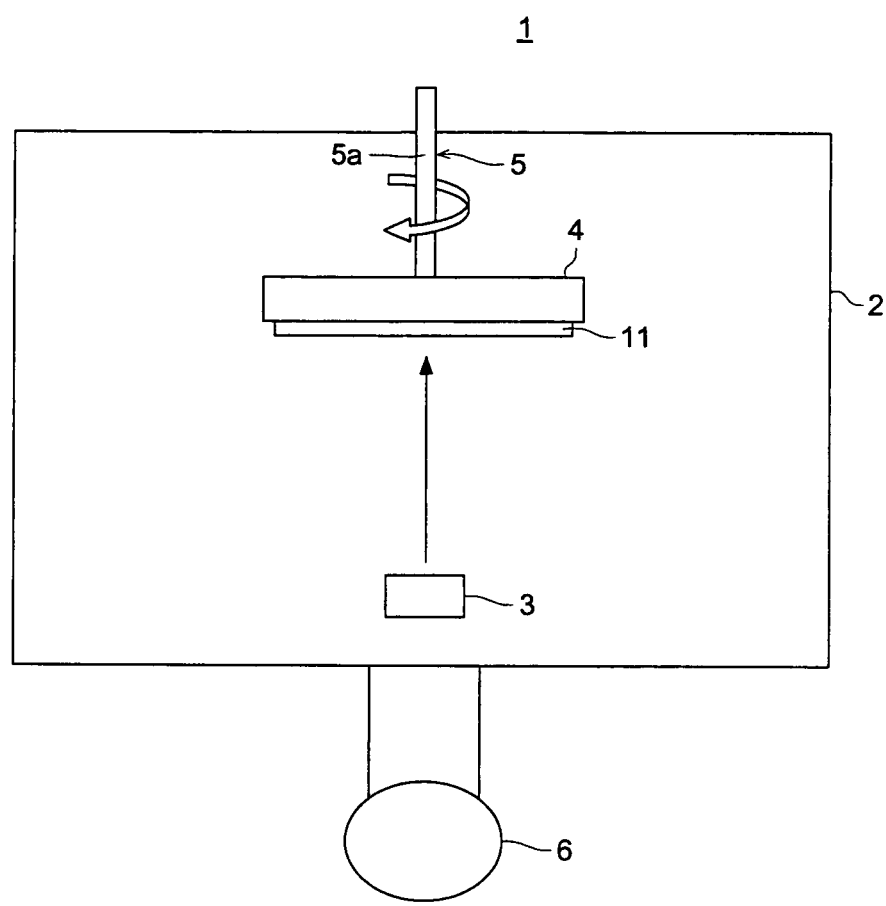
FIG. 3 is a cross sectional view representing a vapor deposition apparatus based on the rotation method.

As shown in FIG. 3, the vapor deposition apparatus 1 comprises:

a vacuum container 2;

an evaporation source 3, arranged inside the vacuum container 2, for depositing vapor onto the support member 11;

a support member holder 4 for supporting the support member 11;

a support member rotating mechanism 5 for depositing vapor from the evaporation source 3 by rotating the support member holder 4 with respect to the evaporation source 3; and a vacuum pump 6 for evacuating the vacuum container 2 and introducing the air therein.

Since the evaporation source 3 stores a stimulable phosphor and heats it by resistance heating, it may be composed of an alumina-made crucible wound with a heater, or a heater comprising a board or a metal of high melting point. Further, in addition to resistance heating method, the stimulable phosphor can be heated by electron beam or high frequency induction. In the present invention, the resistance heating method is preferred because of comparatively simple structure, easy handling, economy and applicability to a wide-ranging substance. The evaporation source 3 can be a molecular beam source by molecular source epitaxial method.

The support member rotating mechanism 5 is composed of a rotating shaft 5a for supporting the support member holder and rotating the support member holder 4; and a motor (not illustrated), arranged outside the vacuum container 2, for serving as a drive source of the rotating shaft 5a.

The support member holder 4 is preferably provided with a heater for heating the support member 11 (not illustrated). Heating of the support member 11 desorbs and removes the substances having been absorbed on the surface of the support member 11, and prevents a layer of impurities from being formed between the surface of the support member 11 and stimulable phosphor. Heating of the support member 11 also increases the adhesion, and adjusts the film quality of the stimulable phosphor layer.

It is also possible to provide a shutter (not illustrated) between the support member 11 and evaporation source 3, for shutting off the space leading from the evaporation source 3 to the support member 11. When the shutter is provided, the substances other than the intended one, attached to the surface of the stimulable phosphor, can be evaporated in the initial phase of vapor deposition, with the result that they do not deposit on the support member 11.

In order to form a stimulable phosphor layer on the support member 11 using the vapor deposition apparatus 1 constructed in the aforementioned manner, it is necessary to mount the support member 11 on the support member holder 4.

Then the vacuum container 2 is evacuated. After that, the support member holder 4 is rotated with respect to the evaporation source 3 by the support member rotating mechanism 5. When the vacuum container 2 has reached the level of vacuum where vapor deposition is possible, the stimulable phosphor is evaporated from the heated evaporation source 3 so that the stimulable phosphor will grow on the surface of the support member 11 to a desired thickness. In this case, the preferred distance between the support member 11 and evaporation source 3 is 100 through 1,500 mm.

The stimulable phosphor used as the evaporation source is preferably processed in a tablet form by compression.

Raw material or mixture of the raw material may be employed in place of the stimulable phosphor.

Figure 2:
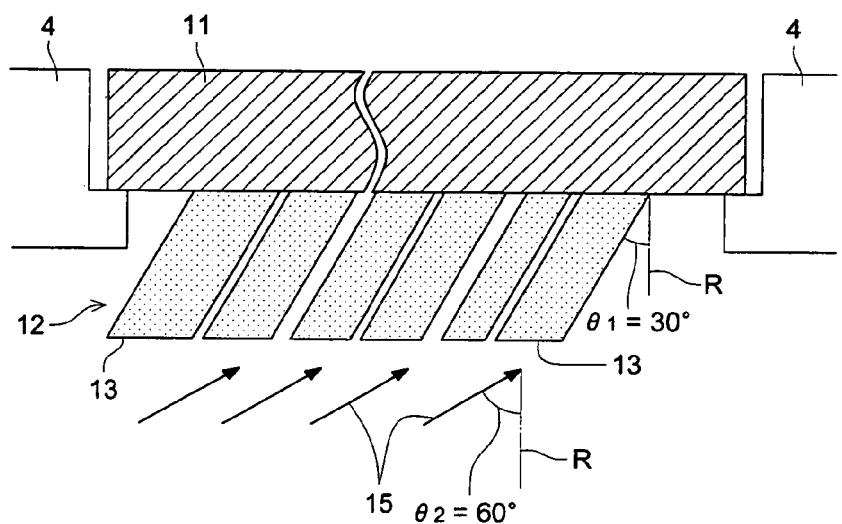
FIG. 2 is a drawing representing how a stimulable phosphor layer is formed on a support member by the vapor deposition method.

FIG. 2 illustrates the mode of forming a stimulable phosphor layer on a support by the vacuum evaporation method, in which vapor streams (16) of a stimulable phosphor are introduced at an incident angle $\theta_2$ (in the Figure, 60°) to the line (R) normal to the support surface to form columnar crystals on the support, at an angle of $\theta_1$ (in the Figure, 30°, empirically, about a half of the incident angle). Incident angle $\theta_2$ of vapor flow 15 is set as 0° in FIG. 3.

A stimulable phosphor layer 12 containing no binder is formed in this way. Space 14 formed between columnar crystals may be filled with binder etc. whereby the stimulable layer is reinforced, or high light absorptive or high light reflective substance. It is advantageous to reinforce and reduction of light scattering to cross direction of stimulable light.

In the foregoing evaporation stage may be divided into plural times to form the stimulable phosphor layer. Alternatively, raw material of a stimulable phosphor is evaporated using plural resistance heaters or electron beams and an intended stimulable phosphor is synthesized on the support, simultaneously forming a targeted stimulable phosphor layer.

Further, in the vacuum evaporation method, during vacuum evaporation, if desired, a vacuum evaporating body (such as a support, a protective layer, or an interlayer) may be either cooled or heated.

Still further, after vacuum evaporation, the resulting stimulable phosphor layer may be subjected to a thermal process. In addition, if desired, reactive vacuum evaporation may be carried out while introducing a gas such as $O_2$ or $H_2$.

Temperature of support on which stimulable phosphor layer formed is preferably set from room temperature (rt) to 300° C., more preferably 50 to 200° C. in the evaporation method of the forming stimulable phosphor layer.

After completion of forming stimulable layer having a layer of particle form crystals and a layer of columnar crystals, the radiation image conversion panel is prepared by forming a protective layer on the support side opposite to the stimulable layer if necessary. The protective layer may be formed by applying a coating composition directly to the of the stimulable layer, or a preliminarily provided protective layer may be adhered to the stimulable layer.

Employed as materials for the protective layer are common materials for protective layers, such as cellulose acetate, nitrocellulose, polymethyl methacrylate), polyvinyl butyral, polyvinyl formal, polycarbonate, polyester, polyethylene terephthalate, polyethylene, polyvinylidene chloride, nylon, polytertafluorinated ethylene, polytrifluorinated-chlorinated ethylene, tetrafluorinated ethylene-hexafluorinated propylene copolymers, vinylidene chloride-vinyl chloride copolymers, and vinylidene chloride-acrylonitrile copolymers. Other than these, employed as the protective layer may be transparent glass substrates.

Further, the protective layer may be formed while preparing a layer comprised of inorganic materials such as SiC, $SiO_2$, SiN, or $Al_2O_3$, employing a vacuum evaporation method or a sputtering method. The thickness of the protective layers is preferably from 0.1 to 2,000 μm.

EXAMPLE

The following specifically describes the present invention with reference to examples.

The inventors of the present invention have manufactured the radiation image conversion panel described in the examples according to the following procedure:

Example 1-1

Manufacturing the Radiation Image Conversion Panel

A vapor deposition apparatus 1 shown in FIG. 3 was used to evaporate the stimulable phosphor (CsBr: 0.0002 Eu) onto one side of the support member comprising a carbon fiber reinforced resin sheet, thereby forming a stimulable phosphor layer.

To be more specific, a resistance heating crucible was filled with the phosphor material as an evaporation material, and a support member 11 was mounted on the rotating support member holder 4. The distance between the support member 11 and evaporation source 3 was adjusted to 400 mm. Then the vapor deposition apparatus 1 was once evacuated, and was then filled with argon gas until the degree of vacuum was 0.1 Pa. Then the temperature of the support member 11 was held at 100° C., while the support member 11 was rotated at a speed of 10 rpm. Then the resistance heating crucible was heated to cause vapor deposition of the stimulable phosphor, until the film thickness of the stimulable phosphor reached 500 μm.

This was followed by the step of placing the stimulable phosphor layer into a protective layer bag in the dry air, thereby getting a radiation image conversion panel with the stimulable phosphor layer sealed up therein.

For the radiation image conversion panel, an X-ray diffraction apparatus (JDX-11RA by JEOL, Ltd.) was used to perform X-ray diffractometry and to get an X-ray diffraction pattern. It was revealed that the index of a plane of the first peak was (1, 0, 0). The in-plane variation coefficient of the first peak intensity was 37%. The variation coefficient was obtained according to the formula. In this case, the peak representing the maximum intensity was defined as a first peak.

Example 1-2

A radiation image conversion panel was manufactured in the same manner as EXAMPLE 1-1, except that the distance between the support member and evaporation source was adjusted to 600 mm. In this case, the radiation image conversion panel obtained showed an isotropic distribution of film thickness, wherein the index of a plane of the first peak was (2, 0, 0) and the in-plane variation coefficient of the first peak intensity was 25%.

Example 1-3

A radiation image conversion panel was manufactured in the same manner as EXAMPLE 1-1, except that the distance between the support member and evaporation source was adjusted to 800 mm. In this case, the radiation image conversion panel obtained showed an isotropic distribution of film thickness, wherein the index of a plane of the first peak was (2, 0, 0) and the in-plane variation coefficient of the first peak intensity was 16%.

Example 1-4

A radiation image conversion panel was manufactured in the same manner as EXAMPLE 1-1, except that the distance between the support member and evaporation source was adjusted to 1,000 mm. In this case, the index of a plane of the first peak of the radiation image conversion panel obtained was (2, 0, 0) and the in-plane variation coefficient of the first peak intensity was 4%.

Comparative Example 1-1

Figure 4:
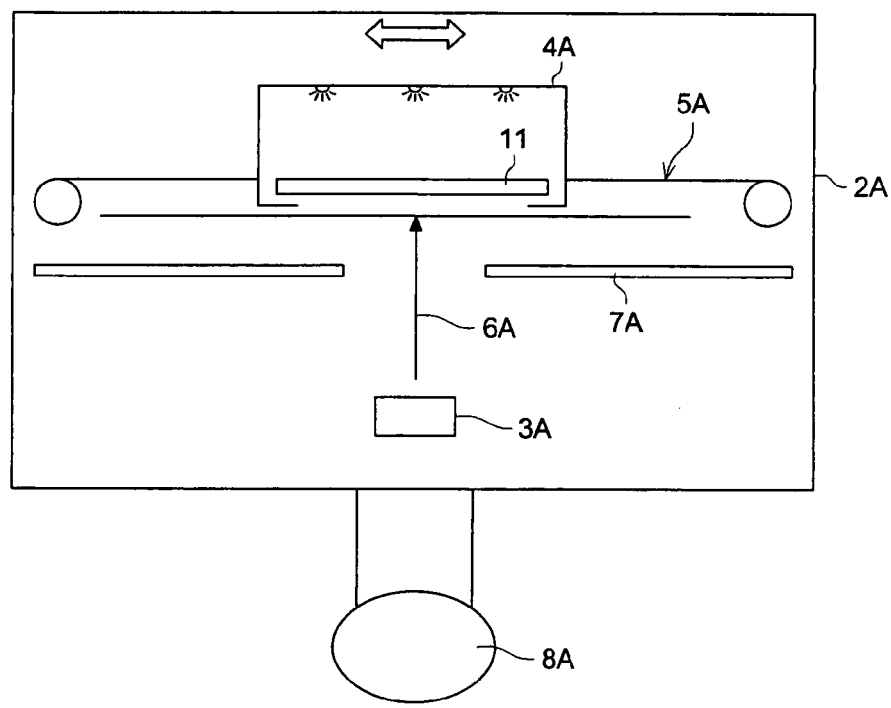
FIG. 4 is a cross sectional view representing the approximate configuration of an vapor deposition apparatus by the conveyance method.

A vapor deposition apparatus 1A shown in FIG. 4 was used to evaporate the stimulable phosphor (CsBr: 0.0002 Eu) onto one side of the support member comprising a carbon fiber reinforced resin sheet, thereby forming a stimulable phosphor layer.

To be more specific, a resistance heating crucible was filled with the phosphor material as an evaporation material, and a support member 11 was mounted on the rotating support member holder 4A. The distance between the support member 11 and evaporation source 3A was adjusted to 400 mm.

Then the vapor deposition apparatus 1A was once evacuated, and was then filled with argon gas until the degree of vacuum was 0.1 Pa. Then while the support member 11 was moved by the support member rotating mechanism 5A in the horizontal direction with respect to the evaporation source 3A, the temperature of the support member 11 was kept at 100° C. Then the resistance heating crucible was heated to cause vapor deposition of the stimulable phosphor, until the film thickness of the stimulable phosphor reached 500 μm. In FIG. 4, numeral 2A denotes a vacuum container, 6A a slit, 7A an adhesion preventive board, and 8A a vacuum pump.

This was followed by the step of placing the stimulable phosphor layer into a protective layer bag in the dry air, thereby getting a radiation image conversion panel with the stimulable phosphor layer sealed up therein.

The radiation image conversion panel obtained in this manner was an anisotropic distribution of film thickness. It was revealed that the index of a plane of the first peak was (2, 0, 0). The in-plane variation coefficient of the first peak intensity was 53%.

Comparative Example 1-2

A radiation image conversion panel was manufactured in the same manner as COMPARATIVE EXAMPLE 1-1, except that the distance between the support member and evaporation source was adjusted to 1,000 mm. In this case, the index of a plane of the first peak of the radiation image conversion panel obtained was (2, 0, 0) and the in-plane variation coefficient of the first peak intensity was 41%.

<<Nonuniformity in Sensitivity>>

After an X-ray having a tube voltage of 80 kvp was applied uniformly to the radiation image conversion panel from the side of the support member opposite to the stimulable phosphor layer, the radiation image conversion panel was scanned and excited by a He—Ne laser beam (633 nm), and the stimulable phosphor emitted from the stimulable phosphor layer was received by a lightness receiver (a photomultiplier having a spectral sensitivity of S-5). Then the intensity was measured and the nonuniformity in sensitivity were evaluated from the variations of intensities among different measuring points. The nonuniformity in sensitivity were obtained as follows: The difference between the maximum and minimum values of the brightness at various measuring points of each panel was divided by the average value of the intensities at 25 measuring points, and the result was expressed in percentage to show the nonuniformity in sensitivity. Table 1 shows the result.

<<Brightness (Relative Sensitivity)>>

The brightness was measured as follows: An X-ray having a tube voltage of 80 kVp was applied to each radiation image conversion panel from the back of the support member. Then the radiation image conversion panel was scanned and excited by a He—Ne laser beam (633 nm), and the stimulable phosphor emitted from the stimulable phosphor layer was received by a lightness receiver (a photomultiplier having a spectral sensitivity of S-5). The intensity was measured and was defined as brightness. The brightness of the radiation image conversion panel in comparative example 1 was assumed as 100, and relative evaluation was made. The result is given in Table 1.

TABLE 1

| | Support member conveyance section | Distance between support member and evaporation source [mm] | Index of a plane of 1st peak | In-plane variation coefficient of 1st peak intensity [%] | Inconsistent sensitivity (%) | Relative sensitivity [—] |
|---|---|---|---|---|---|---|
| Example 1-1 | Rotation | 400 | (1, 0, 0) | 37 | 23 | 100 |
| Example 1-2 | Rotation | 600 | (2, 0, 0) | 25 | 16 | 104 |
| Example 1-3 | Rotation | 800 | (2, 0, 0) | 16 | 11 | 103 |
| Example 1-4 | Rotation | 1000 | (2, 0, 0) | 4 | 5 | 103 |
| Comparative example 1-1 | Conveyance | 400 | (2, 0, 0) | 53 | 34 | 100 |
| Comparative example 1-2 | Conveyance | 1000 | (2, 0, 0) | 41 | 30 | 97 |

As is clear from the result given in Table 1, nonuniformity in sensitivity and deterioration of brightness can be avoided more effectively in the examples 1-1 through 1-4 wherein the variation coefficient of the first peak intensity does not exceed 40%, than in the comparative examples 1 and 2 wherein the variation coefficient exceeds 40%.

Further, more uniform deposition of the stimulable phosphor layer onto the support member is provided by the rotation method wherein vapor deposition is carried out by rotating the support member, as shown in FIG. 3, than by the conveyance method wherein vapor deposition is carried out by feeding the support member in the horizontal direction, as shown in FIG. 4. From this, it can be seen that nonuniformity in sensitivity and deterioration of brightness can be avoided.

Further, from the result of example 4 where the variation coefficient of the first peak intensity is the smallest, it can be seen that nonuniformity in sensitivity and deterioration of brightness can be avoided more effectively if the variation coefficient is smaller.

It can also be seen that the variation coefficient of the first peak intensity is kept smaller and the effect of the present invention is further improved in the examples 2 through 4 wherein the index of a plane of the first peak is (2, 0, 0), than in the example 1 wherein the index of a plane of the first peak is (1, 0, 0).

Thus, in the in-plane X-ray diffraction pattern of the stimulable phosphor layer, here is a correlation between the variation coefficient of the first peak intensity, and sensitivity and brightness. Nonuniformity in sensitivity and deterioration of brightness can be avoided, and hence the radiation image quality can be improved by specifying that the variation coefficient of the first peak intensity should not exceed 40%.

Example 2-1

Manufacturing the Radiation Image Conversion Panel

A vapor deposition apparatus 1 shown in FIG. 3 was used to evaporate the stimulable phosphor (CsBr: 0.0002 Eu) onto one side of the support member comprising a carbon fiber reinforced resin sheet, thereby forming a stimulable phosphor layer.

To be more specific, a resistance heating crucible was filled with the phosphor material as an evaporation material, and a support member 11 was mounted on the rotating support member holder 4. The distance between the support member 11 and evaporation source 3 was adjusted to 300 mm. Then the vapor deposition apparatus 1 was once evacuated, and was then filled with argon gas until the degree of vacuum was 0.1 Pa. Then the temperature of the support member 11 was held at 100° C., while the support member 11 was rotated at a speed of 10 rpm. Then the resistance heating crucible was heated to cause vapor deposition of the stimulable phosphor, until the film thickness of the stimulable phosphor reached 500 μm.

This was followed by the step of placing the stimulable phosphor layer into a protective layer bag in the dry air, thereby getting a radiation image conversion panel with the stimulable phosphor layer sealed up therein.

The radiation image conversion panel obtained in this manner was an isotropic distribution of film thickness. For the radiation image conversion panel, an X-ray diffraction apparatus (JDX-11RA by JEOL, Ltd.) was used to perform X-ray diffractometry and to get an X-ray diffraction pattern. It was revealed that the index of a plane of the first peak was (1, 0, 0). The in-plane variation coefficient of the first peak intensity was 57%. The variation coefficient was obtained according to the aforementioned formula. In this case, the peak representing the maximum intensity was defined as the first peak.

Example 2-2

A radiation image conversion panel was manufactured in the same manner as EXAMPLE 2-1, except that the distance between the support member and evaporation source was adjusted to 400 mm. In this case, the radiation image conversion panel obtained showed an isotropic distribution of film thickness, wherein the index of a plane of the first peak was (1, 0, 0) and the in-plane variation coefficient of the first peak intensity was 37%.

Example 2-3

A radiation image conversion panel was manufactured in the same manner as EXAMPLE 2-1, except that the distance between the support member and evaporation source was adjusted to 600 mm. In this case, the radiation image conversion panel obtained showed an isotropic distribution of film thickness, wherein the index of a plane of the first peak was (2, 0, 0) and the in-plane variation coefficient of the first peak intensity was 25%.

Example 2-4

A radiation image conversion panel was manufactured in the same manner as EXAMPLE 2-1, except that the distance between the support member and evaporation source was adjusted to 800 mm. In this case, the index of a plane of the first peak of the radiation image conversion panel obtained was (2, 0, 0) and the in-plane variation coefficient of the first peak intensity was 16%.

Example 2-5

A radiation image conversion panel was manufactured in the same manner as EXAMPLE 2-1, except that the distance between the support member and evaporation source was adjusted to 1000 mm. In this case, the index of a plane of the first peak of the radiation image conversion panel obtained was (2, 0, 0) and the in-plane variation coefficient of the first peak intensity was 4%.

Comparative Example 2-1

A vapor deposition apparatus 1A shown in FIG. 4 was used to evaporate the stimulable phosphor (CsBr: 0.0002 Eu) onto one side of the support member comprising a carbon fiber reinforced resin sheet, thereby forming a stimulable phosphor layer.

To be more specific, a resistance heating crucible was filled with the phosphor material as an evaporation material, and a support member 11 was mounted on the rotating support member holder 4A. The distance between the support member 11 and evaporation source 3A was adjusted to 400 mm.

Then the vapor deposition apparatus 1A was once evacuated, and was then filled with argon gas until the degree of vacuum was 0.1 Pa. Then while the support member 11 was moved by the support member rotating mechanism 5A in the horizontal direction with respect to the evaporation source 3A, the temperature of the support member 11 was kept at 100° C. Then the resistance heating crucible was heated to cause vapor deposition of the stimulable phosphor, until the film thickness of the stimulable phosphor reached 500 μm. In FIG. 4, numeral 2A denotes a vacuum container, 6A a slit, 7A an adhesion preventive board, and 8A a vacuum pump.

This was followed by the step of placing the stimulable phosphor layer into a protective layer bag in the dry air, thereby getting a radiation image conversion panel with the stimulable phosphor layer sealed up therein.

The radiation image conversion panel obtained in this manner was an anisotropic distribution of film thickness. It was revealed that the index of a plane of the first peak was (2, 0, 0). The in-plane variation coefficient of the first peak intensity was 53%.

Comparative Example 2-2

A radiation image conversion panel was manufactured in the same manner as COMPARATIVE EXAMPLE 2-1, except that the distance between the support member and evaporation source was adjusted to 1000 mm. In this case, the index of a plane of the first peak of the radiation image conversion panel obtained was (2, 0, 0) and the in-plane variation coefficient of the first peak intensity was 41%.

The radiation image conversion panel obtained in the aforementioned manner was evaluated according to the following procedure:

<<Bend of Panel>>

The amount of bend of the radiation image conversion panel was obtained as follows: A feeler gauge was used to measure two upper corners when the radiation image conversion panel was placed on a stainless steel plate of excellent straightness at an angle of 5 degrees, and the remaining two corners after 180-degree rotation. Then the maximum value of these measurements was used to represent the bend (mm) of the radiation image conversion panel. Table 1 shows the results.

<<Shock Resistance>>

A 500-gram steel ball was dropped at a height of 20 cm from the radiation image conversion panel. Then the radiation image conversion panel was visually inspected. After that, an X-ray having a tube voltage of 80 kVp was applied to each radiation image conversion panel from the back of the support member. Then the radiation image conversion panel was scanned and excited by a He—Ne laser beam (633 nm), and the stimulable phosphor emitted from the stimulable phosphor layer was received by a lightness receiver (a photomultiplier having a spectral sensitivity of S-5). After having been converted into an electronic signal, it was reproduced as an image reproducing apparatus, and was printed out by an output apparatus. The shock resistance of the printed image obtained in the aforementioned manner was evaluated according to the following standard by visual observation. The result is given in Table 2.

A: Uniform image without crack
B: Without crack, hardly any problem with image quality
C: A crack is visible with a very small image failure on a practically acceptable level
D: A crack is visible with a clearly discernible image failure on a practically unacceptable level

TABLE 2

| | Support member conveyance section | Distance between support member and evaporation source [mm] | Distribution of 1st peak intensity | Index of a plane of 1st peak | Vari-ation coefficient of 1st peak inten-sity [%] | Bend [mm] | Shock resistance |
|---|---|---|---|---|---|---|---|
| Example 2-1 | Rotation | 300 | Isotropic | (1, 0, 0) | 57 | 2.0 | C |
| Example 2-2 | Rotation | 400 | Isotropic | (1, 0, 0) | 37 | 0.8 | B |

TABLE 2-continued

| | Support member conveyance section | Distance between support member and evaporation source [mm] | Distribution of 1st peak intensity | Index of a plane of 1st peak | Variation coefficient of 1st peak intensity [%] | Bend [mm] | Shock resistance |
|---|---|---|---|---|---|---|---|
| Example 2-3 | Rotation | 600 | Isotropic | (2, 0, 0) | 25 | 0.7 | B |
| Example 2-4 | Rotation | 800 | Isotropic | (2, 0, 0) | 16 | 0.5 | B |
| Example 2-5 | Rotation | 1000 | Isotropic | (2, 0, 0) | 4 | 0.4 | A |
| Comparative example 2-1 | Conveyance | 400 | Anisotropic | (2, 0, 0) | 53 | 4.2 | D |
| Comparative example 2-2 | Conveyance | 1000 | Anisotropic | (2, 0, 0) | 41 | 4.6 | D |

As is clear from Table 2, bend of the panel was extremely small in the examples 2-1 through 2-5 wherein the distribution of the in-plane first intensity of the stimulable phosphor was isotropic from the center of the support member, as compared with the comparative examples 1 and 2 wherein the distribution of the in-plane first intensity of the stimulable phosphor was anisotropic. The shock resistance was also evaluated higher than the C level, and was on practically acceptable level.

More uniform deposition of the stimulable phosphor layer onto the support member is provided by the vapor deposition apparatus according to the rotation method wherein vapor deposition is carried out by rotating the support member, as shown in FIG. 3, than by the vapor deposition apparatus according to the conveyance method wherein vapor deposition is carried out by feeding the support member in the horizontal direction, as shown in FIG. 4. From this, it is also apparent that bend of the panel can be avoided.

It can also be seen that the bend of the panel is smaller and the shock resistance is higher in the examples 2-2 through 2-5 wherein the variation coefficient of the first peak intensity does not exceed 40%, than in the comparative examples 1 and 2 wherein the variation coefficient of the first peak intensity exceeds 40%.

From the result of the example 2-5 where the variation coefficient of the first peak intensity is the smallest, it can be seen that the bend of the panel is smaller and shock resistance is greater if the variation coefficient is smaller.

It can also been seen that the variation coefficient of the first peak intensity is kept smaller and the effect of the present invention is further improved in the examples 3 through 5 wherein the index of a plane of the first peak is (2, 0, 0), than in the examples 1 and 2 wherein the index of a plane of the first peak is (1, 0, 0).

Thus, the bend of the panel can be reduced and the shock resistance can be increased by ensuring that the distribution of the first peak intensity in the in-pane X-ray diffraction pattern of the stimulable phosphor layer is isotropic from the center of the support member. Further, the effect of the present invention can be improved by ensuring that the variation coefficient of the first peak intensity does not exceed 40%.

Example 3-1

Manufacturing the Radiation Image Conversion Panel

A vapor deposition apparatus 1 shown in FIG. 3 was used to evaporate the stimulable phosphor (CsBr: 0.0002 Eu) onto one side of the support member comprising a carbon fiber reinforced resin sheet, thereby forming a stimulable phosphor layer.

To be more specific, a resistance heating crucible was filled with the phosphor material as an evaporation material, and a support member 11 was mounted on the rotating support member holder 4. The distance between the support member 11 and evaporation source 3 was adjusted to 400 mm. Then the vapor deposition apparatus 1 was once evacuated, and was then filled with argon gas until the degree of vacuum was 0.1 Pa. Then the temperature of the support member 11 was held at 100° C., while the support member 11 was rotated at a speed of 10 rpm. Then the resistance heating crucible was heated to cause vapor deposition of the stimulable phosphor, until the film thickness of the stimulable phosphor reached 500 μm.

This was followed by the step of placing the stimulable phosphor layer into a protective layer bag in the dry air, thereby getting a radiation image conversion panel with the stimulable phosphor layer sealed up therein.

The packing factor of the radiation image conversion panel obtained in this case was measured, and the packing factor distribution was isotropic at 8.1%. The distribution of the packing factor was measured according to the aforementioned method.

Example 3-2

A radiation image conversion panel was manufactured in the same manner as EXAMPLE 3-1, except that the distance between the support member and evaporation source was adjusted to 600 mm. In this case, the displaying section of the packing factor of the radiation image conversion panel obtained was isotropic at 4.4%.

Example 3-3

A radiation image conversion panel was manufactured in the same manner as EXAMPLE 3-1, except that the distance between the support member and evaporation source was adjusted to 800 mm. In this case, the radiation image conversion panel obtained showed an isotropic distribution and its packing factor being 2.9%.

Example 3-4

A radiation image conversion panel was manufactured in the same manner as EXAMPLE 3-1, except that the distance between the support member and evaporation source was adjusted to 1,000 mm. In this case, the radiation image conversion panel obtained showed an isotropic distribution and its packing factor being 2.2%.

Comparative Example 3-1

A vapor deposition apparatus 1A shown in FIG. 4 was used to evaporate the stimulable phosphor (CsBr: 0.0002 Eu) onto one side of the support member comprising a carbon fiber reinforced resin sheet, thereby forming a stimulable phosphor layer.

To be more specific, a resistance heating crucible was filled with the phosphor material as an evaporation material, and a support member 11 was mounted on the rotating support member holder 4A. The distance between the support member 11 and evaporation source 3A was adjusted to 1,000 mm.

Then the vapor deposition apparatus 1A was once evacuated, and was then filled with argon gas until the degree of vacuum was 0.1 Pa. Then while the support member 11 was moved by the support member rotating mechanism 5A in the horizontal direction with respect to the evaporation source 3A, the temperature of the support member 11 was kept at 100° C. Then the resistance heating crucible was heated to cause vapor deposition of the stimulable phosphor, until the film thickness of the stimulable phosphor reached 500 µm. In FIG. 4, numeral 2A denotes a vacuum container, 6A a slit, 7A an adhesion preventive board, and 8A a vacuum pump.

This was followed by the step of placing the stimulable phosphor layer into a protective layer bag in the dry air, thereby getting a radiation image conversion panel with the stimulable phosphor layer sealed up therein.

The radiation image conversion panel obtained in this manner was an anisotropic distribution of packing factor. It was observed that the packing factor was 11.2%.

Comparative Example 3-2

A radiation image conversion panel was manufactured in the same manner as COMPARATIVE EXAMPLE 3-1, except that the distance between the support member and evaporation source was adjusted to 400 mm. The radiation image conversion panel obtained in this manner was an anisotropic distribution of packing factor. It was observed that the packing factor was 15.0%.

The radiation image conversion panel obtained in the aforementioned manner was evaluated according to the following procedure:

<<Nonuniformity in Sensitivity>>

After an X-ray having a tube voltage of 80 kvp was applied uniformly to the radiation image conversion panel from the side of the support member opposite to the stimulable phosphor layer, the radiation image conversion panel was scanned and excited by a He—Ne laser beam (633 nm), and the stimulable phosphor emitted from the stimulable phosphor layer was received by a lightness receiver (a photomultiplier having a spectral sensitivity of S-5). Then the intensity was measured and the nonuniformity in sensitivity were evaluated from the variations of intensities among different measuring points. The nonuniformity in sensitivity were obtained as follows: The difference between the maximum and minimum values of the brightness at various measuring points of each panel was divided by the average value of the intensities at 25 measuring points, and the result was expressed in percentage to show the nonuniformity in sensitivity. Table 3 shows the result.

<<Shock Resistance>>

A 500-gram steel ball was dropped at a height of 20 cm from the radiation image conversion panel. Then the radiation image conversion panel was visually inspected. After that, an X-ray having a tube voltage of 80 kVp was applied to each radiation image conversion panel from the back of the support member. Then the radiation image conversion panel was scanned and excited by a He—Ne laser beam (633 nm), and the stimulable phosphor emitted from the stimulable phosphor layer was received by a lightness receiver (a photomultiplier having a spectral sensitivity of S-5). After having been converted into an electronic signal, it was reproduced as an image by an image reproducing apparatus, and was printed out by an output apparatus. The shock resistance of the printed image obtained in the aforementioned manner was evaluated according to the following standard by visual observation. The result is given in Table 3.

A: Uniform image without crack
B: Without crack, hardly any problem with image quality
C: A crack is visible with a very small image failure on a practically acceptable level
D: A crack is visible with a clearly discernible image failure on a practically unacceptable level

TABLE 3

| | Support member | Distance between support member and evaporation source [mm] | Distribution characteristic of packing factor | Distribution of packing factor (%) | Inconsistent sensitivity (%) | Shock resistance |
|---|---|---|---|---|---|---|
| Example 3-1 | Rotation | 400 | Isotropic | 8.1 | 16 | B |
| Example 3-2 | Rotation | 600 | Isotropic | 4.4 | 10 | A |
| Example 3-3 | Rotation | 800 | Isotropic | 2.9 | 7 | A |
| Example 3-4 | Rotation | 1000 | Isotropic | 2.2 | 4 | A |

TABLE 3-continued

|  | Support member | Distance between support member and evaporation source [mm] | Distribution characteristic of packing factor | Distribution of packing factor (%) | Inconsistent sensitivity (%) | Shock resistance |
|---|---|---|---|---|---|---|
| Comparative example 3-1 | Conveyance | 1000 | Anisotropic | 11.2 | 34 | D |
| Comparative example 3-2 | Conveyance | 400 | Anisotropic | 15.0 | 28 | D |

As is clear from Table 1, deterioration of the nonuniformity in sensitivity can be avoided and shock resistance is excellent in the examples 1 through 4 wherein the distribution of the packing factor of the stimulable phosphor layer is within ±10%, as compared with the comparative examples 1 and 2 wherein the distribution of the packing factor of the stimulable phosphor layer exceeds the range of ±10%.

Further, the sensitivity and shock resistance are superior in the examples 1 through 4 wherein the distribution of the packing factor of the stimulable phosphor layer exhibits an isotropic change from the center of the support member toward the end, than in the comparative examples 1 and 2 wherein the distribution of the packing factor of the stimulable phosphor layer is anisotropic.

Further, more uniform deposition of the stimulable phosphor layer onto the support member is provided by the rotation method wherein vapor deposition is carried out by rotating the support member, as shown in FIG. 3, than by the conveyance method wherein vapor deposition is carried out by feeding the support member in the horizontal direction, as shown in FIG. 4. From this, it can be seen that bend of the panel can be avoided. It is also clear that the effect of the present invention is further improved.

It can also be seen that the nonuniformity in sensitivity can be reduced and shock resistance can be improved if the distribution of the packing factor is reduced, as shown in example 4.

Thus, there is a correlation between the distribution of the packing factor of the stimulable phosphor layer, and the sensitivity and shock resistance. Sensitivity and shock resistance is improved, and radiation image quality is improved by specifying the distribution of the packing factor to be kept within ±10%.

The invention claimed is:

1. A manufacturing method for a radiation image conversion panel comprising a phosphor layer comprising phosphor columnar crystals on a support member, the method comprising the step of:
   depositing a phosphor onto the support member via a vapor deposition apparatus to form the phosphor layer on the support member by evaporating the phosphor while the support member is rotating,
   wherein
   a distance between the support member and an evaporation source is 100 to 1,500 mm,
   a distribution of a packing factor of the phosphor is isotropic from the center of the support member toward an end of the plane of the phosphor layer,
   a distribution of a packing factor of the phosphor in the phosphor layer on a plane of the phosphor layer is within ±10%,
   the phosphor is a material represented by the following formula:

$M^1X{:}eA$ wherein $M^1$ is at least one alkali metal atom selected from the group consisting of Rb and Cs; X is a halogen atom selected from the group consisting of Br and I; A is a metal atom selected from the group consisting of Eu, Tl, Na, Cu and Mg; and e is defined as follows:

$0 < e \le 0.1$, and a thickness of the phosphor layer is 50 to 1,000 μm.

2. The manufacturing method of claim 1, wherein the vapor deposition apparatus comprises:
   a vacuum container;
   an evaporation source, arranged inside the vacuum container, to evaporate the phosphor onto the support member; and
   a rotating mechanism for supporting the support member and rotating the support member with respect to the evaporation source.

3. The manufacturing method of claim 1, wherein the evaporation source is a tablet.

4. The manufacturing method of claim 1, wherein support on which the phosphor layer formed is at a temperature of 50 to 200° C. during deposition.

5. The manufacturing method of claim 1, wherein a variation coefficient of distribution of a first peak intensity representing a maximum intensity of an X-ray diffraction pattern inside the phosphor layer on a plane of the phosphor layer is not more than 40%.

6. The manufacturing method of claim 1, wherein a distribution of a first peak intensity representing a maximum intensity in an X-ray diffraction pattern inside the phosphor layer on a plane of the phosphor layer is isotropic from a center toward an end of the plane of the phosphor layer.

7. The manufacturing method of claim 1, wherein the variation coefficient of a first peak intensity is not more than 30%.

8. The manufacturing method of claim 7, wherein the variation coefficient of the first peak intensity is not more than 20%.

9. The manufacturing method of claim 7, wherein the variation coefficient of the first peak intensity is not more than 10%.

10. The manufacturing method of claim 1, wherein an index of a plane of a first peak is (x,0,0), wherein x is 1, 2 or 3.

11. The manufacturing method of claim 10, wherein an index of a plane of the first peak is (x,0,0), wherein x is 2.

12. The manufacturing method of claim 1, wherein the distribution of a packing factor of the phosphor layer exhibits an isotropic change from a center toward an end of the plane of the phosphor layer.

13. A manufacturing method for a radiation image conversion panel comprising a phosphor layer comprising phosphor columnar crystals on a support member, the method comprising the step of:

depositing a phosphor onto the support member to form the phosphor layer on the support member by evaporating the phosphor from an evaporation source containing the phosphor while the support member is rotating, and filling a binder between the phosphor columnar crystals, wherein a distance between the support member and the evaporation source is 100 to 1,500 mm, a distribution of packing factor of the phosphor in the phosphor layer on a plane of the phosphor layer is within ±10%, and a distribution of a packing factor of the phosphor is isotropic from the center of the support member toward an end of the plane of the phosphor layer, and the phosphor is a material represented by the formula:

$$M^1X{:}eA$$

wherein $M^1$ is at least one alkali metal atom selected from the group consisting of Rb and Cs; X is a halogen atom selected from the group consisting of Br and I; A is a metal atom selected from the group consisting of Eu, Tl, Na, Cu and Mg; and e is defined as follows: $0 < e \leq 0.1$, and a thickness of the phosphor layer is 50 to 1,000 μm.

14. A manufacturing method for a radiation image conversion panel comprising a phosphor layer comprising phosphor columnar crystals on a support member, the method comprising the step of;

depositing a phosphor onto the support member to form the phosphor layer on the support member by evaporating the phosphor from an evaporation source containing the phosphor while the support member is rotating, wherein a distance between the support member and the evaporation source is 100 to 1,500 mm, a distribution of packing factor of the phosphor in the phosphor layer on a plane of the phosphor layer is within ±10%, a distribution of a packing factor of the phosphor is isotropic from the center of the support member toward an end of the plane of the phosphor layer, and the phosphor is a material represented by the formula:

$$M^1X{:}eA$$

wherein $M^1$ is at least one alkali metal atom selected from the group consisting of Rb and Cs; X is a halogen atom selected from the group consisting of Br and I; A is a metal atom selected from the group consisting of Eu, Tl, Na, Cu and Mg; and e is defined as follows: $0 \leq e \leq 0.1$, and a thickness of the phosphor layer is 50 to 1,000 μm.

* * * * *